(12) United States Patent
Eade

(10) Patent No.: US 8,976,065 B2
(45) Date of Patent: Mar. 10, 2015

(54) TEMPERATURE SENSOR FOR OSCILLATOR AND FOR SATELLITE POSITIONING CIRCUITRY

(75) Inventor: Philip Geoffrey Eade, Guildford (GB)

(73) Assignee: Nokia Corporation, Espoo (FI)

( * ) Notice: Subject to any disclaimer, the term of this patent is extended or adjusted under 35 U.S.C. 154(b) by 965 days.

(21) Appl. No.: 13/124,050

(22) PCT Filed: Oct. 15, 2008

(86) PCT No.: PCT/EP2008/063913
§ 371 (c)(1),
(2), (4) Date: Jun. 28, 2011

(87) PCT Pub. No.: WO2010/043260
PCT Pub. Date: Apr. 22, 2010

(65) Prior Publication Data
US 2011/0316742 A1  Dec. 29, 2011

(51) Int. Cl.
*G01S 19/23* (2010.01)
*G01S 19/03* (2010.01)

(52) U.S. Cl.
CPC .................................... *G01S 19/235* (2013.01)
USPC .................... 342/357.62; 342/357.4

(58) Field of Classification Search
CPC ..... G01S 19/235; G01S 19/258; G01S 19/30; G01S 19/35; G01S 19/37
USPC ............. 342/357.4, 357.62, 357.77; 701/467, 701/468
See application file for complete search history.

(56) References Cited

U.S. PATENT DOCUMENTS

| 6,928,275 | B1 | 8/2005 | Patrick et al. |
| 7,375,681 | B1 | 5/2008 | Woo |
| 2003/0176204 | A1 | 9/2003 | Abraham |
| 2008/0164952 | A1 | 7/2008 | Babitch |

FOREIGN PATENT DOCUMENTS

| CN | 1610836 A | 4/2005 |
| EP | 1 282 941 A2 | 2/2003 |
| WO | WO 03/038464 A2 | 5/2003 |

OTHER PUBLICATIONS

Office Action for European Application No. 08 875 186.2 dated Feb. 3, 2012.
Lim et al., *Miniature Oven Controlled Crystal Oscillator (OCXO) on a CMOS Chip*, International Frequency Control Symposium and Exposition, IEEE (2006) 401-404.
Search Report for International Application No. PCT/EP2008/063913, mailed Aug. 3, 2009.
Written Opinion for Application No. PCT/EP2008/063913 filed Oct. 15, 2008.
Office Action for Chinese Application No. 200880131571.1 dated Sep. 4, 2013.

*Primary Examiner* — Dao Phan
(74) *Attorney, Agent, or Firm* — Alston & Bird LLP

(57) ABSTRACT

An apparatus and a method, the apparatus comprising: a temperature compensated oscillator; satellite positioning circuitry; and a temperature sensor configured to provide a first control output to the temperature compensated oscillator and to provide a second control output to the satellite positioning circuitry.

20 Claims, 3 Drawing Sheets

| TEMPERATURE | ADJUSTED TIMING VALUE |
| --- | --- |
| TEMPERATURE A | ADJUSTED TIMING VALUE A |
| TEMPERATURE B | ADJUSTED TIMING VALUE B |
| ⋮ | ⋮ |
| TEMPERATURE N | ADJUSTED TIMING VALUE N |

TEMPERATURE SENSOR FOR OSCILLATOR AND FOR SATELLITE POSITIONING CIRCUITRY

FIELD OF THE INVENTION

Embodiments of the present invention relate to timing. In particular, they relate to timing used for receiving satellite positioning signals.

BACKGROUND TO THE INVENTION

A satellite positioning receiver receives signals from remote satellites in order to determine its position. The signals are transmitted by the satellites using a carrier wave. For example, carrier waves of signals transmitted by satellites that operate in accordance with the Global Positioning System (GPS) have a frequency of 1.575 GHz.

A satellite positioning receiver uses an oscillator to receive transmitted satellite signals. The oscillator is used to perform down-conversion from the carrier frequency to a baseband frequency.

Certain factors, such as temperature, can cause the oscillation frequency of the oscillator to change, making it uncertain. This uncertainty has an effect on the size of the frequency band that a satellite positioning receiver scans when searching for satellite positioning signals. As the uncertainty in the oscillation frequency increases, the frequency band to be searched becomes larger.

BRIEF DESCRIPTION OF VARIOUS EMBODIMENTS OF THE INVENTION

According to various, but not necessarily all, embodiments of the invention there is provided an apparatus, comprising: a temperature compensated oscillator; satellite positioning circuitry; and a temperature sensor configured to provide a first control output to the temperature compensated oscillator and to provide a second control output to the satellite positioning circuitry.

The temperature compensated oscillator and the temperature sensor may be comprised in a first semiconductor device, and the satellite positioning circuitry may be comprised in at least a second semiconductor device, different to the first semiconductor device.

The first semiconductor device may be separate to the second semiconductor device, and the first semiconductor device may be operatively connected to the second semiconductor device. The temperature compensated oscillator and the temperature sensor may be monolithic.

The first and second control outputs may be provided simultaneously. The first control output may include first temperature data and the second control output may include second temperature data. The first temperature data and the second temperature data may relate to the same temperature value. The first temperature data and the second temperature data may be the same.

The satellite positioning circuitry may be configured to scan for satellite positioning signals in dependence upon the second control output. The temperature compensated oscillator may be configured to use the first control output to provide a temperature compensated clock signal to the satellite positioning circuitry, and wherein the satellite positioning circuitry may be configured to scan for satellite positioning signals in dependence upon the temperature compensated clock signal and the second control output.

According to various, but not necessarily all, embodiments of the invention there is provided a method, comprising: transferring first temperature data from a temperature sensor to a temperature compensated oscillator, and transferring second temperature data from the temperature sensor to satellite positioning circuitry.

The first temperature data and the second temperature sensor may be transferred from the temperature sensor simultaneously. The first temperature data and the second temperature data may relate to the same temperature value. The first temperature data and the second temperature data may be the same.

The method may further comprise scanning for satellite positioning signals in dependence upon the second control output.

The method may further comprise using the first temperature data to provide a temperature compensated clock signal to the satellite positioning circuitry, and scanning for satellite positioning signals in dependence upon the temperature compensated clock signal and the second temperature data.

According to various, but not necessarily all, embodiments of the invention there is provided an apparatus, comprising: oscillation means for providing a temperature compensated clock signal; satellite positioning means for receiving satellite positioning signals; and temperature sensing means for providing a first control output to the oscillation means and to provide a second control output to the satellite positioning means.

According to various, but not necessarily all, embodiments of the invention there is provided an apparatus, comprising: a temperature compensated oscillator; and a temperature sensor configured to provide a first control output to the temperature compensated oscillator and a second control output to external circuitry.

The temperature compensated oscillator and the temperature sensor may be comprised in the same semiconductor device. The temperature sensor may be configured to provide the first control output and the second control output simultaneously. The external circuitry may, for example, be satellite positioning circuitry.

According to various, but not necessarily all, embodiments of the invention there is provided an apparatus, comprising: a temperature compensated oscillator; satellite positioning circuitry; and temperature sensing circuitry configured to provide a first control output to the temperature compensated oscillator and to provide a second control output to the satellite positioning circuitry, wherein the temperature compensated oscillator and the temperature sensing circuitry are comprised in a first semiconductor device and the satellite positioning circuitry is comprised in at least a second semiconductor device, different to the first semiconductor device.

The temperature sensing circuitry may be a single temperature sensor. Alternatively, the temperature sensing circuitry may comprise first and second temperature sensors, the first temperature sensor being configured to provide the first control output to the temperature compensated oscillator and the second temperature sensor being configured to provide the second control output to the satellite positioning circuitry.

According to various, but not necessarily all, embodiments of the invention there is provided an apparatus, comprising: a temperature compensated oscillator; and temperature sensing circuitry configured to provide a first control output to the temperature compensated oscillator and a second control output to external circuitry, wherein the temperature compensated oscillator and the temperature sensing circuitry are comprised in a first semiconductor device and the external circuitry is comprised in at least a second semiconductor device, different to the first semiconductor device.

The temperature sensing circuitry may be a single temperature sensor. Alternatively, the temperature sensing circuitry may comprise first and second temperature sensors, the first temperature sensor being configured to provide the first control output to the temperature compensated oscillator and the second temperature sensor being configured to provide the second control output to the external circuitry.

The external circuitry, may, for example, be satellite positioning circuitry.

BRIEF DESCRIPTION OF THE DRAWINGS

For a better understanding of various examples of embodiments of the present invention reference will now be made by way of example only to the accompanying drawings in which:
FIG. 3 illustrates reference data stored in a memory.

DETAILED DESCRIPTION OF VARIOUS EMBODIMENTS OF THE INVENTION

Figure 1:
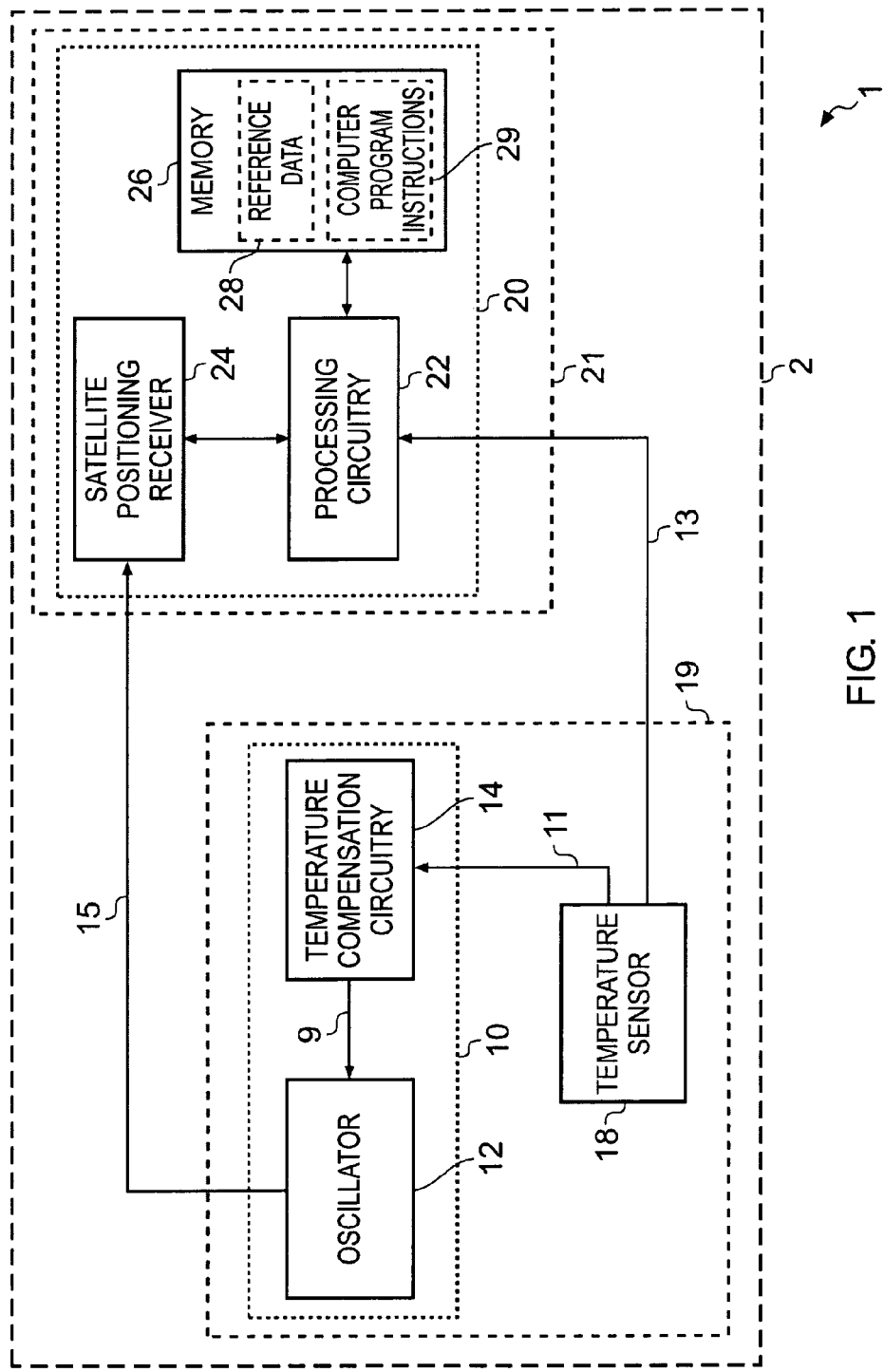
FIG. 1 illustrates an apparatus.

The Figures illustrate an apparatus 1, comprising: a temperature compensated oscillator 10; satellite positioning circuitry 20; and a temperature sensor 18 configured to provide a first control output 11 to the temperature compensated oscillator 10 and to provide a second control output 13 to the satellite positioning circuitry 20.

FIG. 1 illustrates an apparatus 1. The apparatus 1 may be an electronic apparatus. For example, the apparatus 1 illustrated in FIG. 1 may be a portion of a hand portable electronic apparatus such as a mobile telephone, a portable music player, a personal digital assistant or a dedicated satellite navigation device.

The apparatus 1 comprises a temperature compensated oscillator 10, a temperature sensor 18, satellite positioning circuitry 20 and a connection apparatus 2.

The connection apparatus 2 is configured to provide electrical interconnects that operatively couple the temperature compensated oscillator 10, the temperature sensor 18 and the satellite positioning circuitry 20.

For example, in some embodiments of the invention, the connection apparatus 2 is a module that houses the temperature compensated oscillator 10, the temperature sensor 18 and the satellite positioning circuitry 20. The module may be attachable to a printed circuit board. In some other embodiments of the invention, the connection apparatus 2 is a printed circuit board that electrically couples the temperature compensated oscillator 10, the temperature sensor 18 and the satellite positioning circuitry 20.

The temperature compensated oscillator 10 and the temperature sensor 18 may, for example, be comprised in a first semiconductor device 19. That is, the temperature compensated oscillator 10 and the temperature sensor 18 may be monolithic.

The satellite positioning circuitry 20 may be comprised in one or more semiconductor devices including at least a second semiconductor device 21. In the illustrated embodiment, the first semiconductor device 19 is operatively coupled to the second semiconductor device 21 by the connecting apparatus 2 and is separated from the second semiconductor device 21 by the connecting apparatus 2.

The temperature compensated oscillator 10 comprises an oscillator 12 and temperature compensation circuitry 14. The satellite positioning circuitry 20 comprises, in this example, processing circuitry 22, a satellite positioning receiver 24 and a memory 26.

The oscillator 12, the temperature compensation circuitry 14, the temperature sensor 18, the processing circuitry 22, the satellite positioning receiver 24 and the memory 26 are operatively coupled and any number or combination of intervening elements can exist between them (including no intervening elements).

The temperature sensor 18 is configured to provide a first control output 11 to the temperature compensation circuitry 14. The first control output 11 may be in digital or analog format. The first output 11 may, for example, be temperature data that indicates the temperature of the oscillator 12 to the temperature compensation circuitry 14.

The oscillator 12 is configured to provide a clock signal. The frequency of the clock signal provided by the oscillator 12 may vary, depending upon the temperature of the oscillator 12. The temperature compensation circuitry 14 is configured to compensate for variance in the frequency of the oscillator 12 by driving the oscillator 12 using a control signal 9.

The temperature compensation circuitry 14 may effectively act to maintain the frequency of the temperature compensated clock signal 15 by varying the control signal 9 that drives the oscillator 12 in dependence upon the control input 11 from the temperature sensor 18.

The temperature sensor 18 is configured to provide a second control output 13 to the processing circuitry 22 of the satellite positioning circuitry 20. The second control output may be in digital or analog format, and may be temperature data that indicates the temperature of the oscillator 12 to the processing circuitry 22.

The processing circuitry 22 is configured to receive the control input 13 from the temperature sensor 18, to provide an output to and receive an input from the satellite positioning receiver 24, and to write to and read from the memory 26.

The term "satellite positioning receiver" is considered to relate to any type of satellite positioning system. The satellite positioning receiver 24 may be configured to receive positioning information from a plurality of satellites and to determine a position of the apparatus 1 using the received positioning information. For example, the satellite positioning receiver 24 may be configured to receive positioning information from one, some or all of the following satellite constellations: the Global Positioning System (GPS), the Russian system GLONASS, the proposed European positioning system Galileo and the Chinese system Compass.

The satellite positioning receiver 24 may also be configured to operate in accordance with one or more satellite based augmentation systems, such as: the Wide Area Augmentation System (WAAS), the European Geostationary Navigation Overlay Service (EGNOS), the Multi-functional Satellite Augmentation System (MSAS), the Quasi Zenith Satellite System (QZSS) or the GPS Aided Geo Augmented Navigation (GAGAN).

Although the memory 26 is illustrated as a single component it may be implemented as one or more separate components some or all of which may be integrated/removable and/or may provide permanent/semi-permanent/dynamic/cached storage.

The memory 26 stores computer program instructions 29 that control the operation of the apparatus 1 when loaded into the processing circuitry 22. The computer program instructions 29 provide logic and routines that enable the apparatus 1 to perform the method illustrated in FIG. 2. The processing circuitry 22 by reading the memory 26 is able to load and execute the computer program instructions 29.

References to "processing circuitry" and "computer program instructions" should be understood to encompass not only computers having different architectures such as single/multi-processor architectures and sequential (e.g. Von Neumann)/parallel architectures but also specialized circuits such as field-programmable gate arrays (FPGA), application specific circuits (ASIC), signal processing devices and other devices. References to "computer program instructions" should be understood to encompass software for a programmable processor or firmware such as, for example, the programmable content of a hardware device whether instructions for a processor, or configuration settings for a fixed-function device, gate array or programmable logic device etc.

Examples of the operation of the apparatus 1 will now be described with reference to FIGS. 1, 2 and 3.

The temperature sensor 18 senses a temperature of the oscillator 12 and provides a first control output 11, in the form of temperature data, to the temperature compensation circuitry 14 indicating the sensed temperature. For ease of explanation, assume that the sensed temperature is 25° C. The temperature sensor 18 also provides a second control output 13 to the processing circuitry 22. The first and second outputs 11, 13 may, for example, be the same. The first and second outputs 11, 13 may or may not be provided simultaneously by the temperature sensor 18.

The temperature compensation circuitry 14 uses the first control input 11 from the temperature sensor 18 to control the oscillator 12 using a control signal 9. The oscillator 12 uses the control signal 9 from the temperature compensation circuitry 14 to provide a temperature compensated clock signal 15 to the satellite positioning receiver 24.

The satellite positioning receiver 24 uses the temperature compensated clock signal 15 to down-convert received satellite positioning signals from a carrier frequency. The precise value of the frequency of the temperature compensated clock signal 15 may not be known. Instead, the frequency of the temperature compensated clock signal 15 may be known to be within a certain range.

The uncertainty associated with the frequency of the temperature compensated clock signal 15 affects the range of frequencies that the satellite positioning receiver 24 scans for satellite positioning signals.

For instance, consider a situation where the satellite positioning signals are GPS signals and the temperature compensated clock signal 15 has a frequency of 16 MHz+/−8 Hz (i.e. the frequency is known to an accuracy of +/−0.5 parts per million (ppm)).

GPS signals have a 1.575 GHz carrier frequency. The frequency of the temperature compensated clock signal 15 is up-converted by a synthesizer in the satellite positioning receiver 24 for the purpose of down-converting the received satellite positioning signals from the carrier frequency.

The up-converted temperature compensated clock signal 15 has a frequency of 1.575 Ghz+/−787.5 Hz. Consequently, the satellite positioning receiver 24 has to search across a frequency range of 1575 Hz in order to receive GPS signals, due to the uncertainty in the temperature compensated clock signal 15. If each search has a 50 Hz bandwidth, for example, 32 searches will be needed to scan across the range created by the uncertainty.

Once the satellite positioning receiver 24 has scanned across the range of frequencies created by the uncertainty in the up-converted temperature compensated clock signal 15, the satellite positioning receiver 24 analyzes the results of the scan, and acquires and receives satellite positioning signals from three or more satellites in dependence upon the analysis.

Each of the satellites transmitting the satellite positioning signals comprises a highly accurate oscillator. The frequency of the clock signal provided by the oscillators in the satellites is known to a greater accuracy than the frequency of the temperature compensated clock signal 15.

After acquiring the satellite signals and calculating the Position, Velocity, Time (PVT) solution, the highly accurate timing of the satellites is known to the satellite positioning receiver 24. The satellite positioning receiver 24 uses the highly accurate timing of the satellites to determine a precise timing error in the temperature compensated clock signal 15. Determination of the timing error enables the satellite positioning receiver 24 to determine the frequency of the temperature compensated clock signal 15 that is provided by the temperature compensated oscillator 10 at the present temperature (i.e. 25° C.) to a higher degree of accuracy than previously known.

For example, satellite positioning receiver 24 may be able to determine the current frequency/timing of the temperature compensated clock signal 15 to an accuracy of less than +/−0.01 ppm.

After the timing error has been determined, the satellite positioning circuitry provides an "adjusted timing value" for the temperature compensated clock signal 15 to the processing circuitry 22.

In some embodiments of the invention, the "adjusted timing value" is the timing error. In other embodiments of the invention, the "adjusted timing value" is an absolute value relating to the frequency of the temperature compensated clock signal 15.

The processing circuitry 22 associates the adjusted timing value with the temperature data that is provided by the temperature sensor 18 (indicating that the current temperature of 25° C.), and stores the adjusted timing value, the temperature data and the association as reference data 28.

At some later point in time, the satellite positioning receiver 24 may be used to re-scan for satellite positioning signals from satellites in order to determine the position of the apparatus 1.

Figure 2:
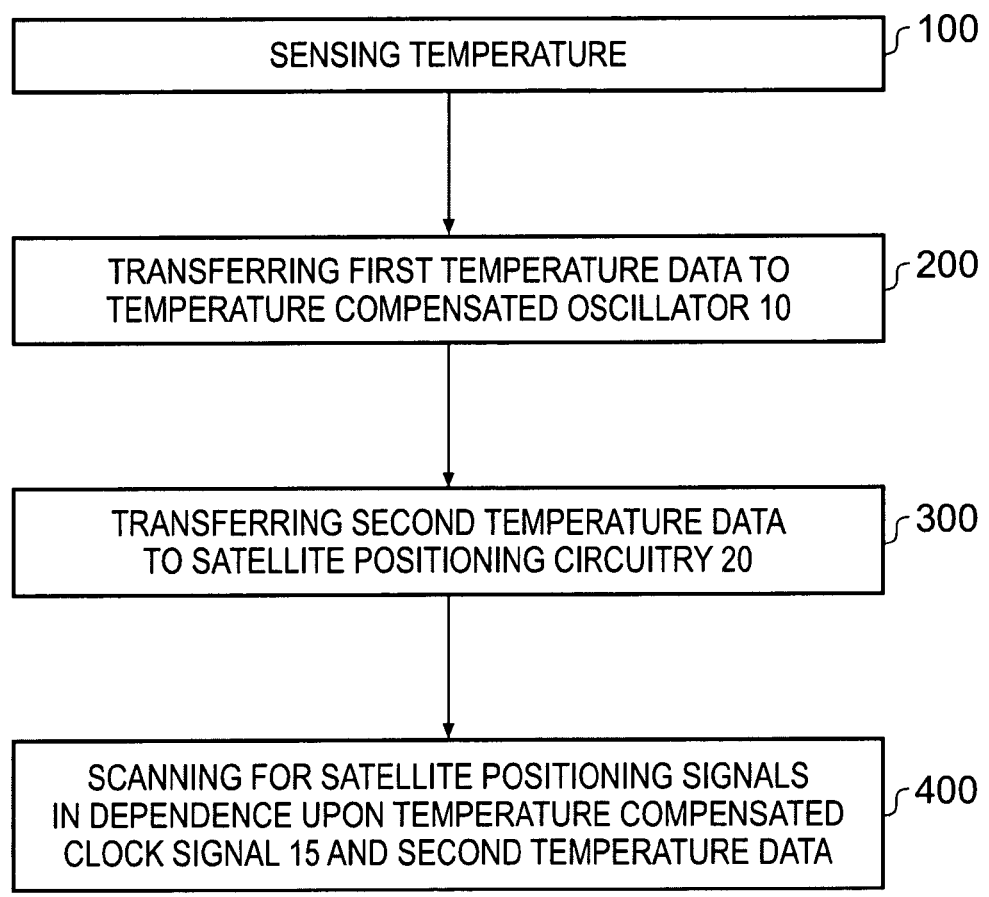
FIG. 2 illustrates a flow chart of a method.

In this regard, at block 100 of FIG. 2, the temperature sensor 18 senses the temperature of the oscillator 12.

At block 200 of FIG. 2, the temperature sensor 18 provides a first control output 11, in the form of first temperature data, to the temperature compensation circuitry 14. The first temperature data indicates the temperature of the oscillator 12 to the temperature compensation circuitry 14.

The first temperature data may, in some embodiments of the invention, indicate the absolute temperature of the oscillator. In other embodiments, it may indicate the temperature of the oscillator relative to a previous temperature.

The temperature compensation circuitry 14 then uses the first temperature data to control the oscillator 12 to provide a temperature compensated clock signal 15 to the satellite positioning receiver 24 in the manner described above.

At block 300 of FIG. 2, the temperature sensor 18 provides a second control output 13, in the form of second temperature data, to the processing circuitry 22. The first and second control outputs 11, 13 may or may not be provided simultaneously by the temperature sensor 18.

The second temperature data provided to the processing circuitry 22 may or may not be the same as the first temperature data provided to the temperature compensation circuitry 14. The second temperature data may, in some embodiments of the invention, indicate the absolute temperature of the oscillator. In other embodiments, it may indicate the temperature of the oscillator relative to a previous temperature.

The processing circuitry 22 compares the second temperature data with the temperature data with that stored as reference data 28 in the memory 26.

Consider a situation where the temperature indicated by the second temperature data is the same as a temperature indicated by temperature data that is stored in the memory 28 (i.e. the stored temperature data relates to a temperature of 25° C.).

In this situation, the processing circuitry 22 retrieves the adjusted timing value associated with the matching stored temperature data. The processing circuitry 22 then provides the retrieved adjusted timing value to the satellite positioning receiver 24.

At block 400 of FIG. 2, the satellite positioning receiver 24 uses the retrieved adjusted timing value and the temperature compensated clock signal 15 to scan for satellite positioning signals.

The adjusted timing value enables the accuracy of the temperature compensated clock signal 15 to be known to an accuracy of, for example, +/−0.1 ppm, which is better than that known when the previous scan was performed by the satellite positioning receiver 24 (+/−0.5 ppm). As the uncertainty in the frequency of the temperature compensated clock signal 15 is now lower, the range of frequencies to be searched when scanning for satellite positioning signals is reduced. This advantageously reduces the time and/or the amount of processing power required to perform the scan.

A further advantage of embodiments of the invention resides in the fact that the temperature sensor 18 that provides the second output 13 to the processing circuitry 22 is the same (and/or is part of the same semiconductor device 19) as that which provides the first output 11 to the temperature compensation circuitry 14. This minimizes uncertainty, because the temperature compensation circuitry 14 is effectively using same temperature information to compensate the clock signal 9 as that which is being recorded by the processing circuitry 22 in the memory 26.

In the event that the processing circuitry 22 receives second temperature data from the temperature sensor 18 which indicates a temperature that is not the same as a temperature indicated in stored temperature data, the processing circuitry 22 may be configured to determine whether temperature data is stored that in the memory 26 that relates to a similar temperature to the temperature indicated in the second temperature data. If this is the case, an adjusted timing value for the indicated temperature may be determined by the processing circuitry 22 by performing linear interpolation or extrapolation using the stored temperature data and its associated adjusted timing values.

If the processing circuitry 22 determines that there is no temperature data stored in the memory 26 that relates to the same or a similar temperature to that indicated in the second temperature data, the satellite positioning receiver 24 rescans for satellite positioning signals without using an adjusted timing value. That is, in this example, the satellite positioning receiver 24 assumes that the frequency of the temperature compensated clock signal 15 is known to an accuracy of +/−0.5 ppm.

Following the rescan, the satellite positioning receiver 24 acquires and receives satellite positioning signals from three or more satellites. The satellite positioning receiver 24 then determines an adjusted timing value for the temperature indicated in the second temperature data in the manner described above. The adjusted timing value is provided to the processing circuitry 22. The processing circuitry 22 associates the adjusted timing value with the second temperature data and stores the adjusted timing value, the second temperature data and the association in the memory 26. Using this process, the processing circuitry 22 may build a look up table of reference data 28, as illustrated in FIG. 3.

The processing circuitry 22 may also be configured to adjust the adjusted timing values stored in the reference data 28, and/or configure the temperature compensation circuitry 14, and/or configured the satellite positioning receiver 24 to take account of aging or re-start characteristics of the oscillator 12.

The blocks illustrated in FIG. 2 may represent steps in a method and/or sections of code in the computer program instructions 29. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, a single temperature sensor 18 is described above as providing a first control output 11 to the temperature compensation circuitry 14 and a second control output 13 to the processing circuitry 22. However, in other embodiments of the invention, two different temperature sensors may be provided in the first semiconductor device 19: one for providing the first control output 11 to the temperature compensation circuitry 14 and one for providing the second control output 13 to the processing circuitry 22.

The satellite positioning circuitry 20 is described above as being comprised in at least one semiconductor device 21. In practice, the satellite positioning receiver 24, the processing circuitry 22 and the memory 26 may be separate semiconductor devices.

Other modifications may be made without departing from the scope of the invention as claimed. For example, the temperature compensation circuitry 14 may provide the temperature compensated clock signal 15 to the processing circuitry 22, which in turn may provide a clock signal to the satellite positioning receiver 24. Also, the memory 26 may be external to the satellite positioning circuitry 20.

Although the satellite positioning receiver 24 and the processing circuitry 22 have been described as being separate components, in some embodiments of the invention the satellite positioning receiver 24 and the processing circuitry 22 may be provided as a single component.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus, comprising:
   a temperature compensated oscillator configured to provide a temperature compensated clock signal;

satellite positioning circuitry; and
a temperature sensing circuitry configured to provide first temperature data to the temperature compensated oscillator and to provide second temperature data to the satellite positioning circuitry, wherein the satellite positioning circuitry is configured to: scan for satellite positioning signals in a first range of frequencies; receive satellite positioning signals; determine, using the satellite positioning signals, an adjusted timing value for the temperature compensated clock signal; store the adjusted timing value and associated second temperature data; and using the adjusted timing value, rescan for satellite positioning signals in a second range of frequencies, the second range being smaller than the first range.

2. An apparatus as claimed in claim 1, wherein the first semiconductor device is separate to the second semiconductor device, and the first semiconductor device is operatively connected to the second semiconductor device.

3. An apparatus as claimed in claim 1, wherein the temperature compensated oscillator and the temperature sensing circuitry are monolithic.

4. An apparatus as claimed in claim 1, wherein the temperature sensing circuitry is configured to provide the first and second control outputs simultaneously.

5. An apparatus as claimed in claim 1, wherein the first temperature data and the second temperature data relate to the same temperature value.

6. An apparatus as claimed in claim 1, wherein the first temperature data and the second temperature data are the same.

7. An apparatus as claimed in claim 1, wherein the satellite positioning circuitry is configured to scan for satellite positioning signals in dependence upon the second control output.

8. An apparatus as claimed in claim 1, wherein the temperature compensated oscillator is configured to use the first control output to provide a temperature compensated clock signal to the satellite positioning circuitry, and wherein the satellite positioning circuitry is configured to scan for satellite positioning signals in dependence upon the temperature compensated clock signal and the second control output.

9. A method, comprising:
causing first temperature data to be transferred from temperature sensing circuitry to a temperature compensated oscillator; and
causing second temperature data to be transferred from the temperature sensing circuitry to satellite positioning circuitry, wherein the method further comprises
causing the satellite positioning circuitry to: scan for satellite positioning signals in a first range of frequencies; determine, using received satellite positioning signals, an adjusted timing value for the temperature compensated clock signal; store the adjusted timing value and associated second temperature data; and using the adjusted timing value, rescan for satellite positioning signals in a second range of frequencies, the second range being smaller than the first range.

10. A method as claimed in claim 9, wherein the first temperature data and the second temperature sensor is transferred from the temperature sensing circuitry simultaneously.

11. A method as claimed in claim 9, wherein the first temperature data and the second temperature data relate to the same temperature value.

12. A method as claimed in claim 9, wherein the first temperature data and the second temperature data are the same.

13. A method as claimed in claim 9, further comprising scanning for satellite positioning signals in dependence upon the second control output.

14. A method as claimed in claim 9, further comprising using the first temperature data to provide a temperature compensated clock signal to the satellite positioning circuitry, and scanning for satellite positioning signals in dependence upon the temperature compensated clock signal and the second temperature data.

15. An apparatus as claimed in claim 1, wherein the temperature sensing circuitry is a single temperature sensor.

16. An apparatus as claimed in claim 1, wherein the temperature sensing circuitry comprises first and second temperature sensors, the first temperature sensor being configured to provide the first control output to the temperature compensated oscillator and the second temperature sensor being configured to provide the second control output to the satellite positioning circuitry.

17. A non-transitory computer readable medium storing a computer program comprising computer program instructions that, when executed by processing circuitry, enable at least the following to be performed:
causing first temperature data to be transferred from temperature sensing circuitry to a temperature compensated oscillator;
causing second temperature data to be transferred from the temperature sensing circuitry to satellite positioning circuitry, and
causing the satellite positioning circuitry to: scan for satellite positioning signals in a first range of frequencies; determine, using received satellite positioning signals, an adjusted timing value for the temperature compensated clock signal; store the adjusted timing value and associated second temperature data; and using the adjusted timing value, rescan for satellite positioning signals in a second range of frequencies, the second range being smaller than the first range.

18. A non-transitory computer readable medium as claimed in claim 17, wherein the temperature sensing circuitry is a single temperature sensor.

19. A non-transitory computer readable medium as claimed in claim 17, wherein the temperature sensing circuitry comprises first and second temperature sensors, wherein the first temperature sensor is configured to provide a first control output comprising the first temperature data to the temperature compensated oscillator and the second temperature sensor is configured to provide a second control output comprising the second temperature data to the satellite positioning circuitry.

20. An apparatus as claimed in claim 1, wherein: the satellite positioning circuitry is configured to determine, using the satellite positioning signals, a timing error for the temperature compensated clock signal; and the adjusted timing value comprises the timing error, or the adjusted timing value is derived from the timing error.

* * * * *